(12) United States Patent
Bhattacharjya et al.

(10) Patent No.: US 6,369,904 B1
(45) Date of Patent: Apr. 9, 2002

(54) USER VERIFICATION BY ZERO-KNOWLEDGE INTERACTIVE PROOF

(75) Inventors: Anoop Bhattacharjya, Sunnyvale; Hakan Ancin, Cupertino, both of CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/204,608

(22) Filed: Dec. 1, 1998

Related U.S. Application Data

(63) Continuation-in-part of application No. 09/136,161, filed on Aug. 18, 1998.

(51) Int. Cl.[7] .............................................. G06K 15/00
(52) U.S. Cl. ...................... 358/1.14; 358/1.15; 382/100; 382/232
(58) Field of Search ........................... 380/51, 201–204, 380/54, 55; 283/113; 358/1.14, 1.15, 1.1, 1.2, 1.3, 1.4, 1.5, 1.6, 1.9, 1.11, 1.13, 1.18, 426, 261.1, 261.2, 261.3, 427, 262.1, 430, 431, 432–433, 468, 450, 448, 452, 438, 434; 382/100, 232; 713/176

(56) References Cited

U.S. PATENT DOCUMENTS

| | | | |
|---|---|---|---|
| 5,257,119 A | * 10/1993 | Funada et al. | 358/438 |
| 5,315,098 A | 5/1994 | Tow | 235/494 |
| 5,541,741 A | * 7/1996 | Suzuki | 358/450 |
| 5,699,427 A | 12/1997 | Chow et al. | 380/3 |
| 5,710,636 A | 1/1998 | Curry | 358/298 |
| 5,710,834 A | 1/1998 | Rhoads | 382/232 |
| 5,734,752 A | 3/1998 | Knox | 382/212 |

* cited by examiner

Primary Examiner—Dov Popovici

(57) ABSTRACT

A scanner (12) derives a digital image of a document that it scans optically, an image-processing circuitry (14) extracts a representation of a non-planner graph. A small-processor "smart card" derives from the first graph a second graph that is isomorphic to it and related to it in accordance with a secret permutation matrix. The image processor 14 then embeds a representation of that graph into the image and sends the results to a printer (16) to generate a copy. A second scanner (30) generates a digital image of the copy, and processing circuitry (31) extracts the two isomorphic graphs, which it conveys to a verifier circuit (36) as well as the smart card (22). By repeatedly generating and submitting to the verifier (36) test graphs that are isomorphic to the extracted graphs, the smart card (22) can demonstrate, without revealing the secret permutation matrix, that it is in possession of that permutation matrix. It does so by sending the verifier a permutation matrix that relates the test graph to the extracted graph of the verifier's choice.

32 Claims, 12 Drawing Sheets

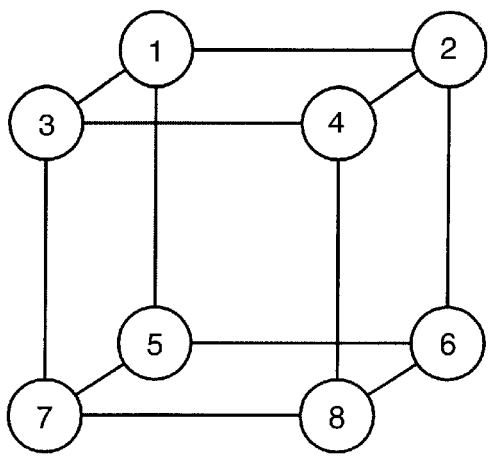
FIG._1A
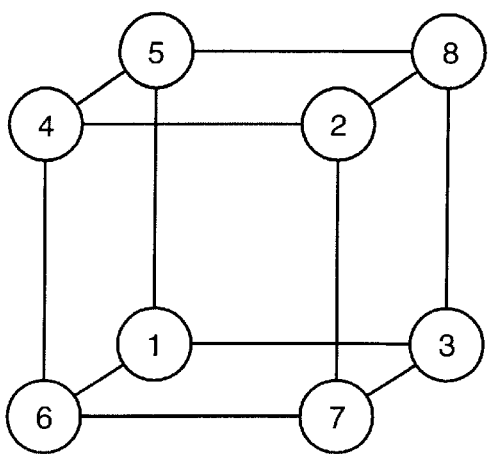
FIG._1B
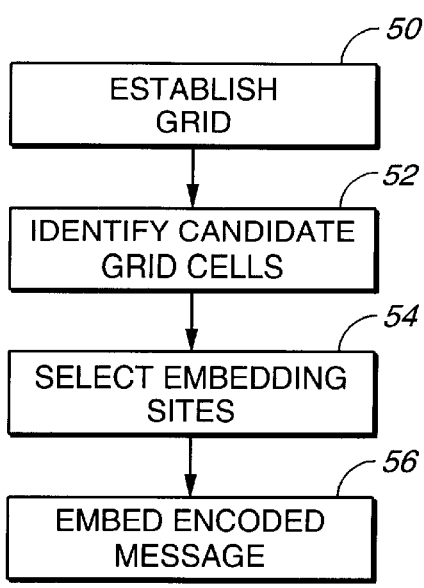
FIG._5

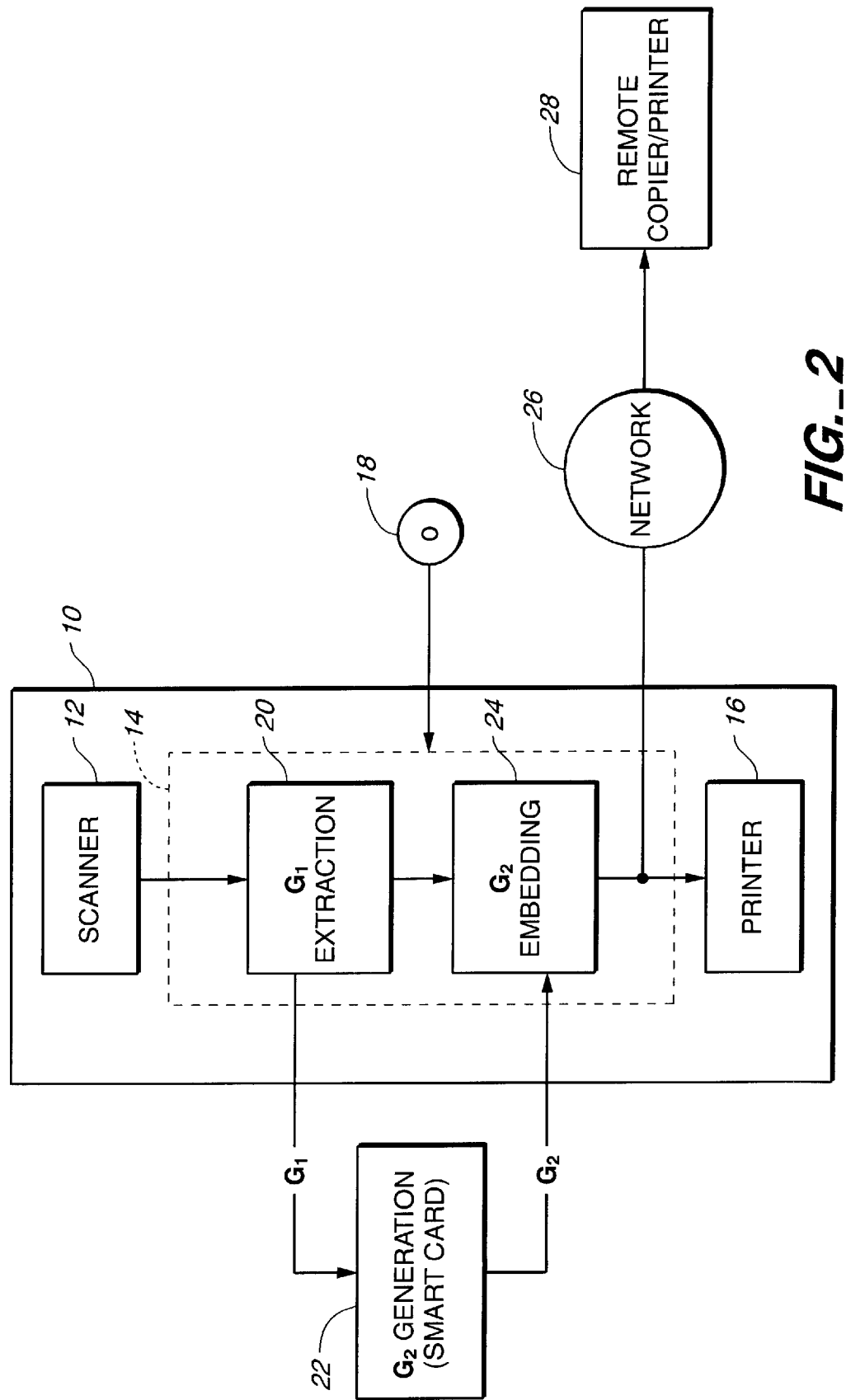

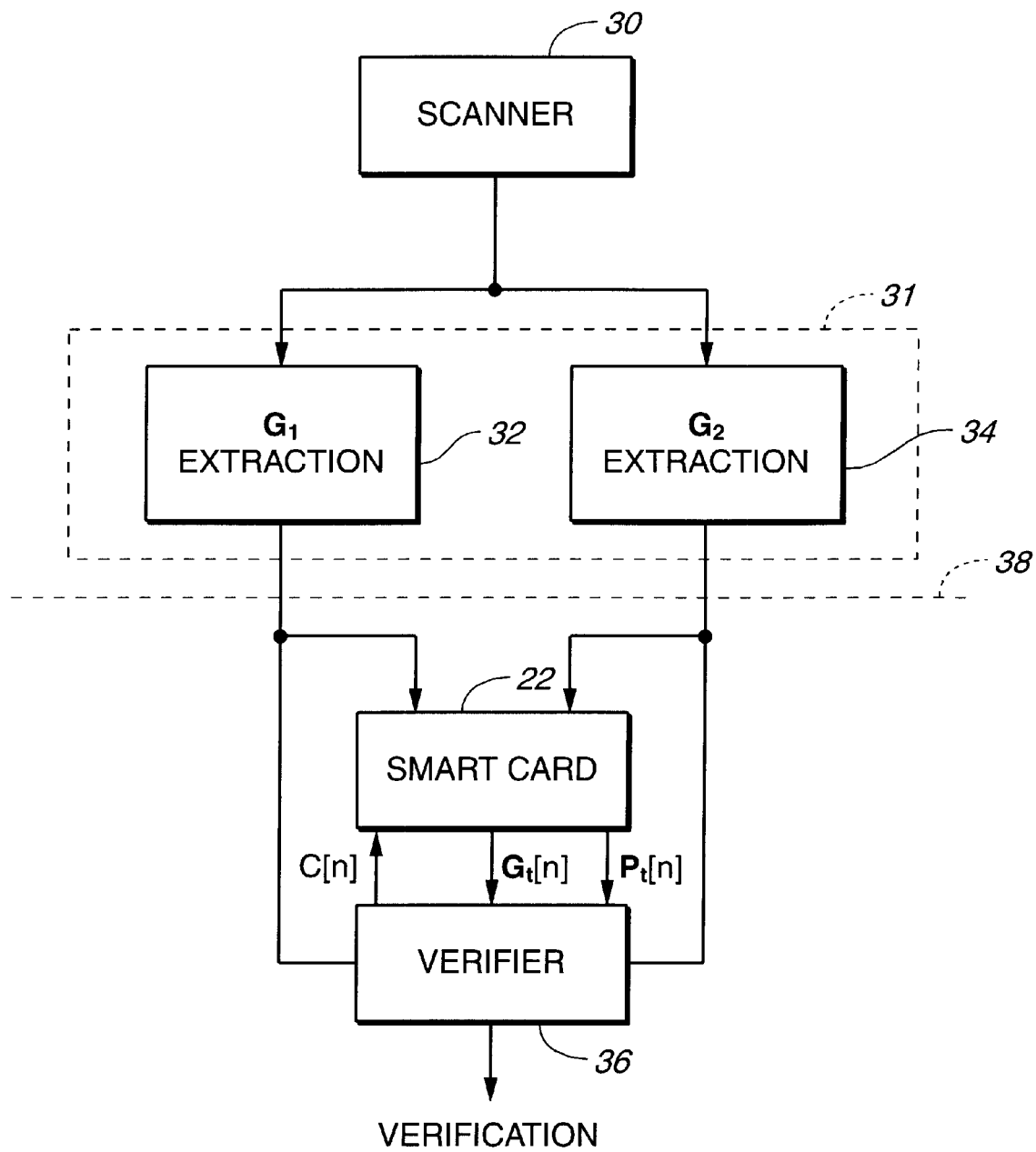
FIG._3

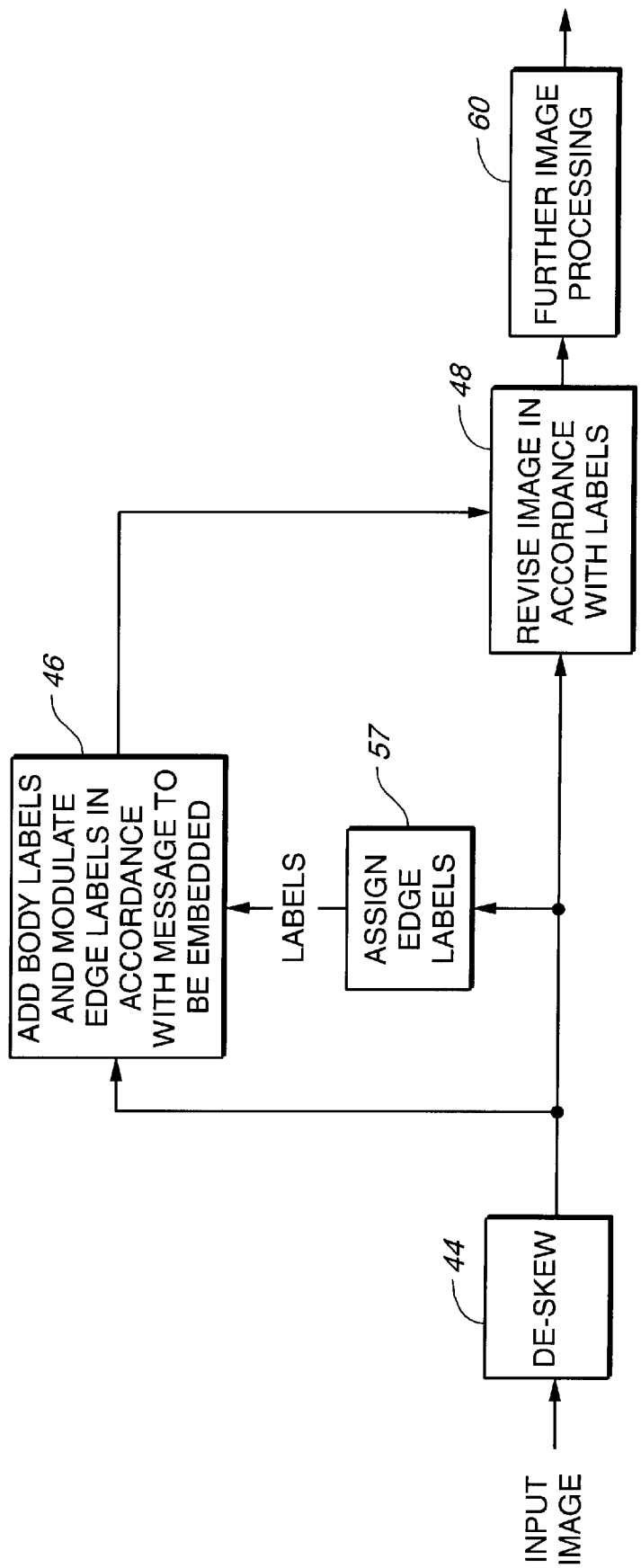
FIG._4

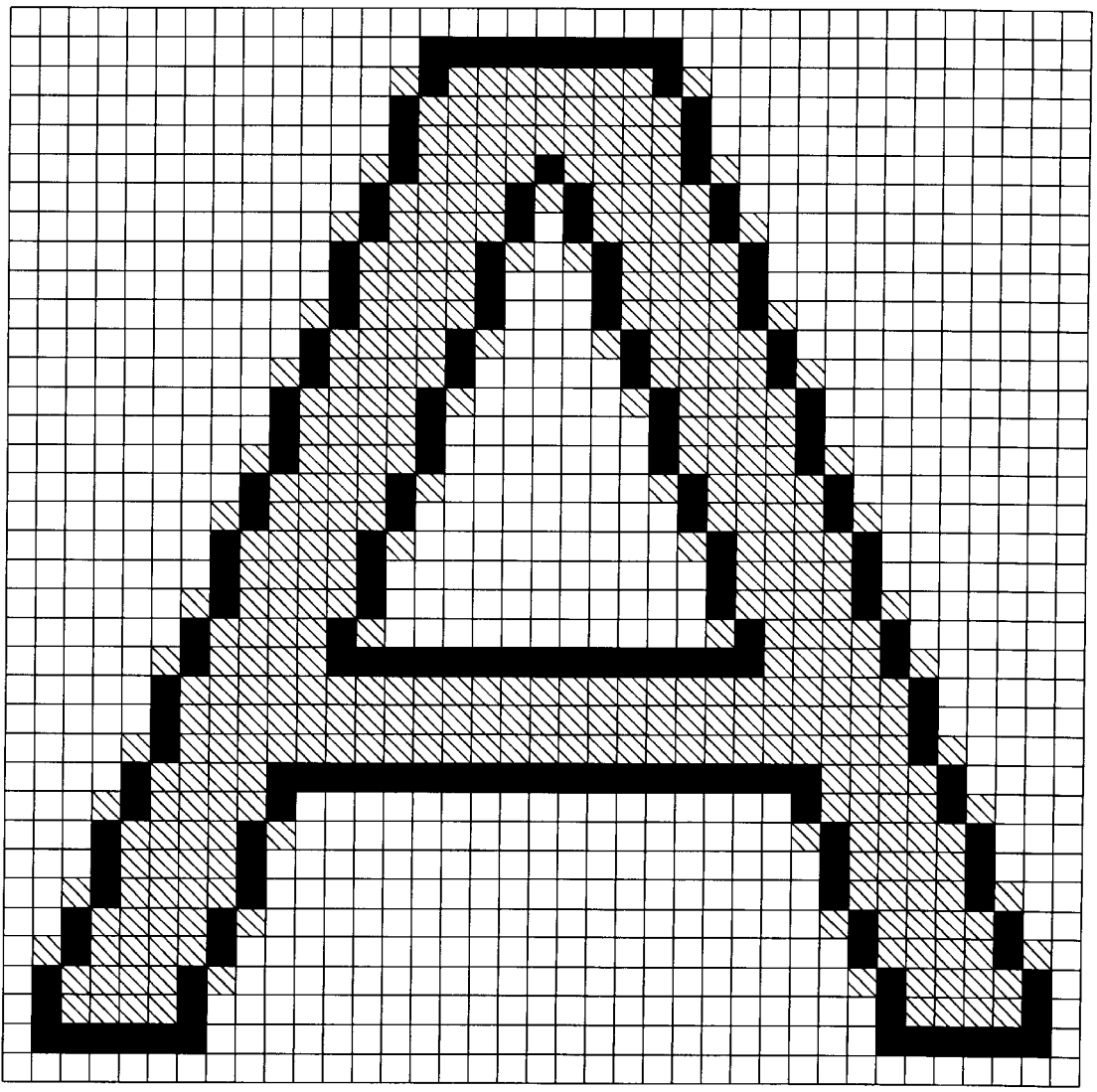
FIG._6

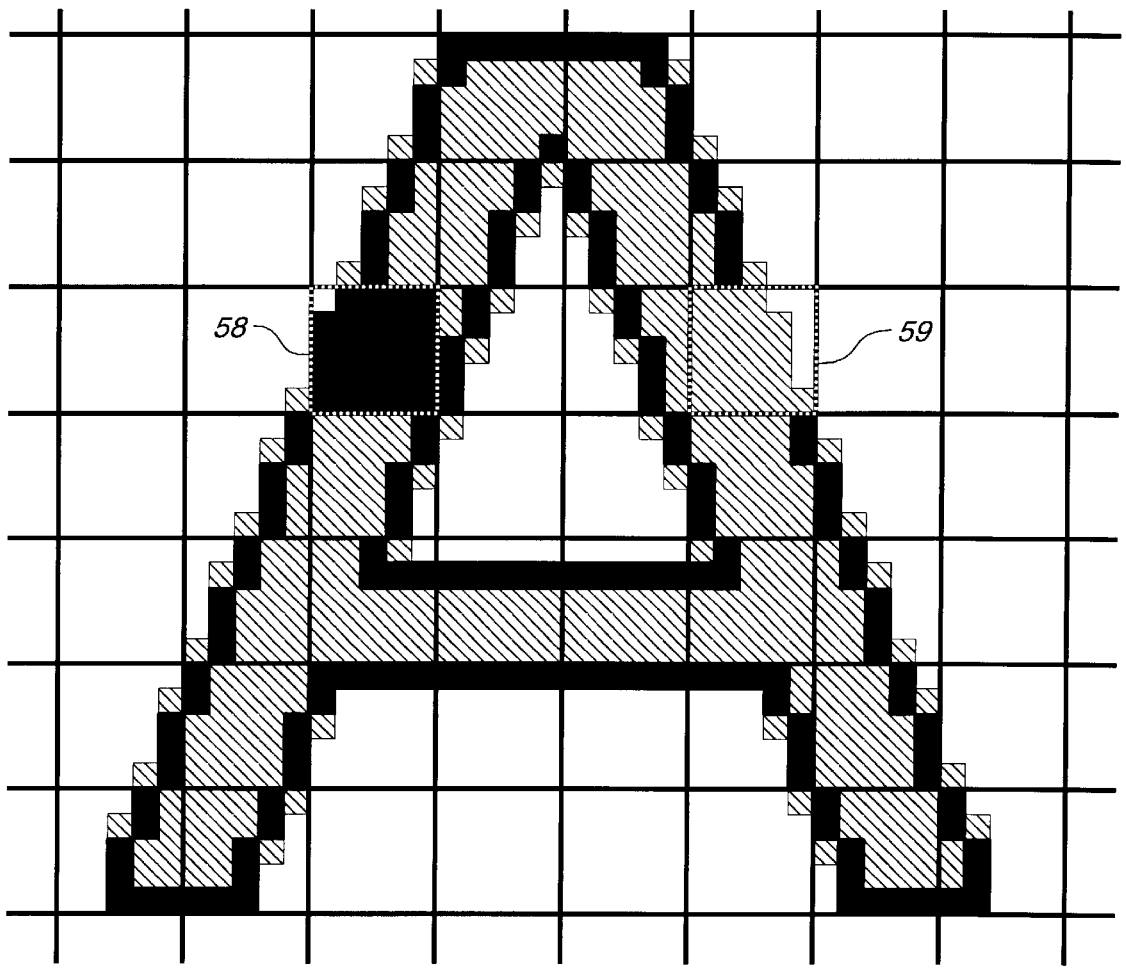
FIG._7

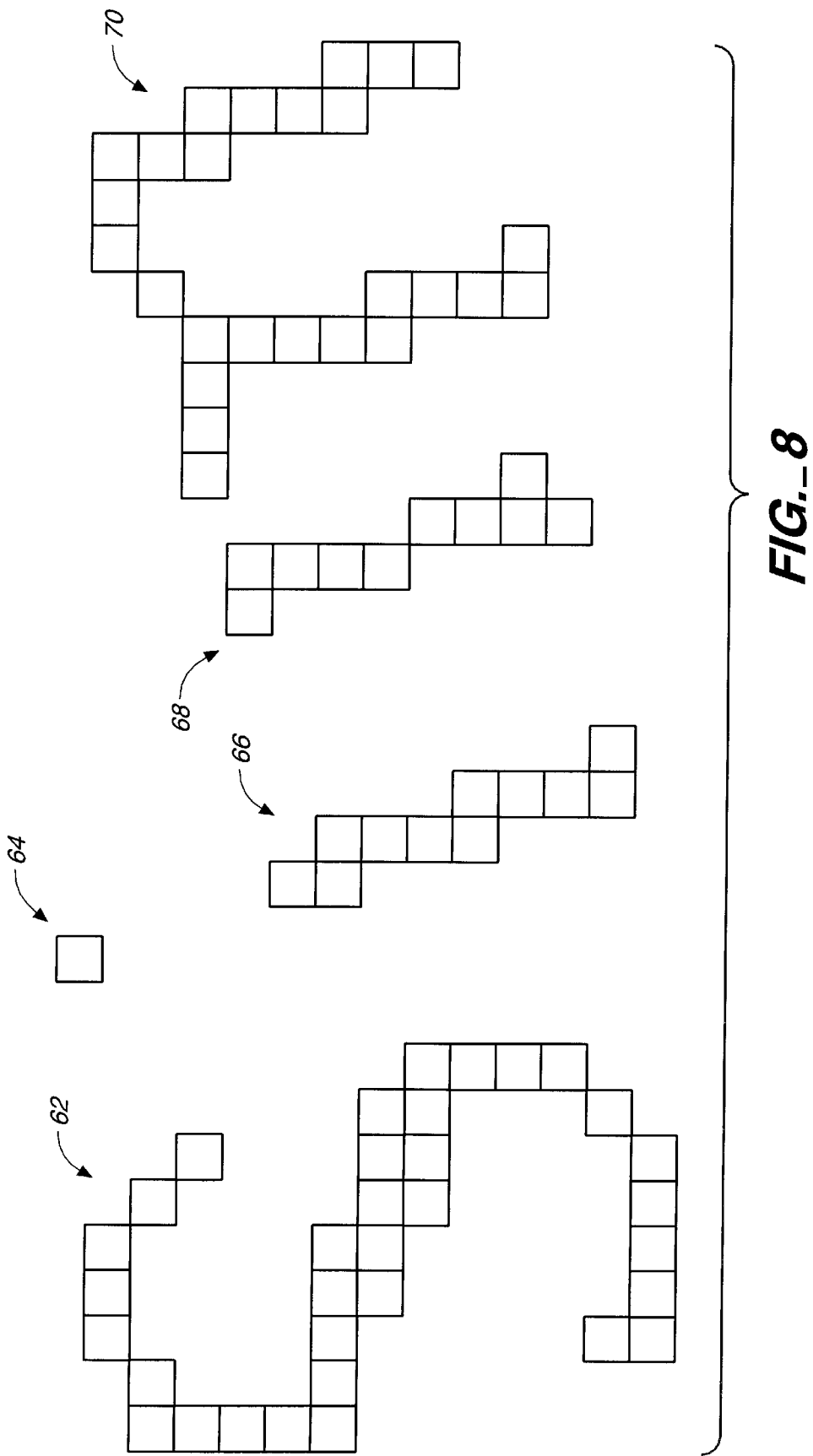

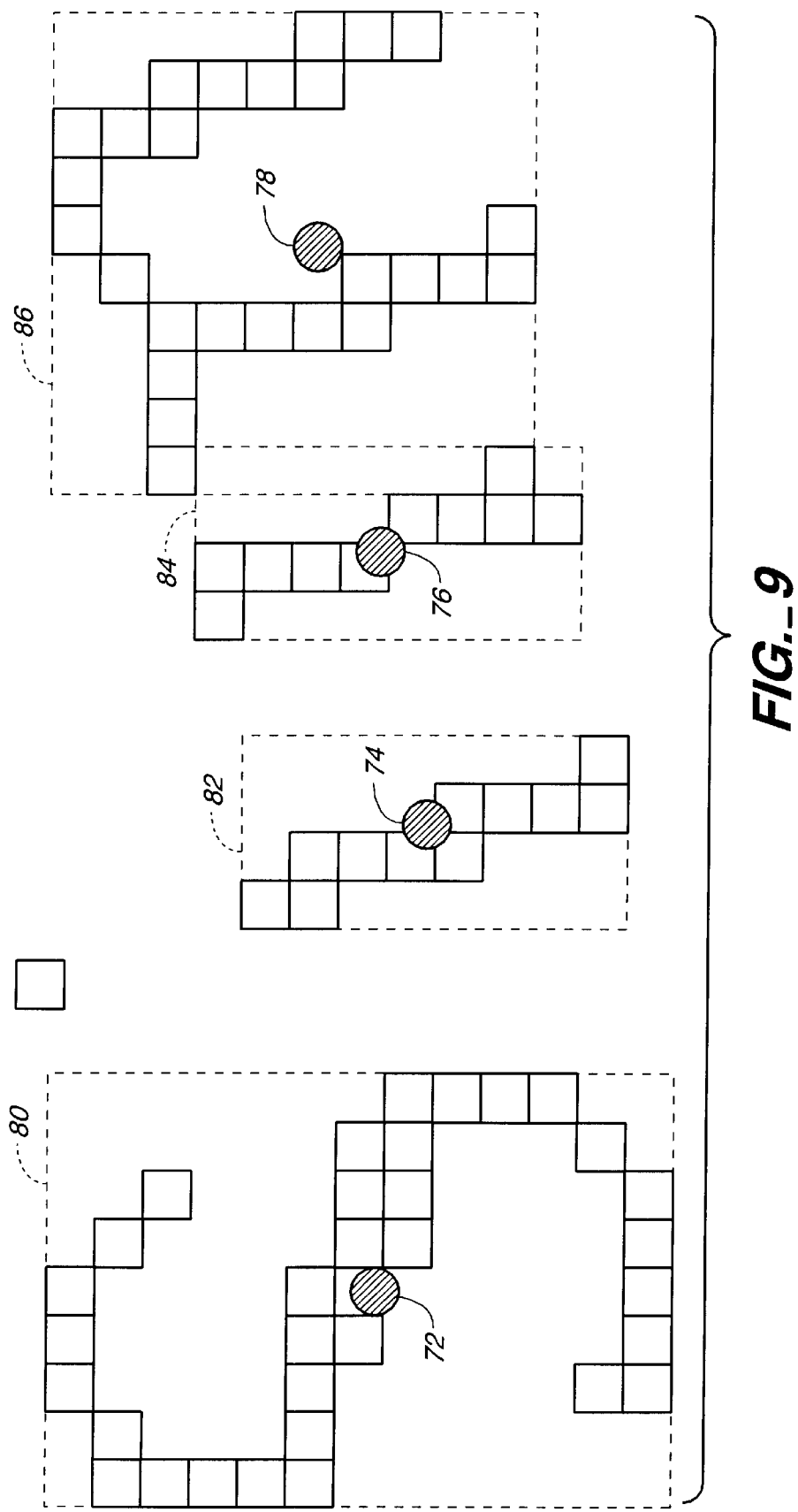
FIG._9

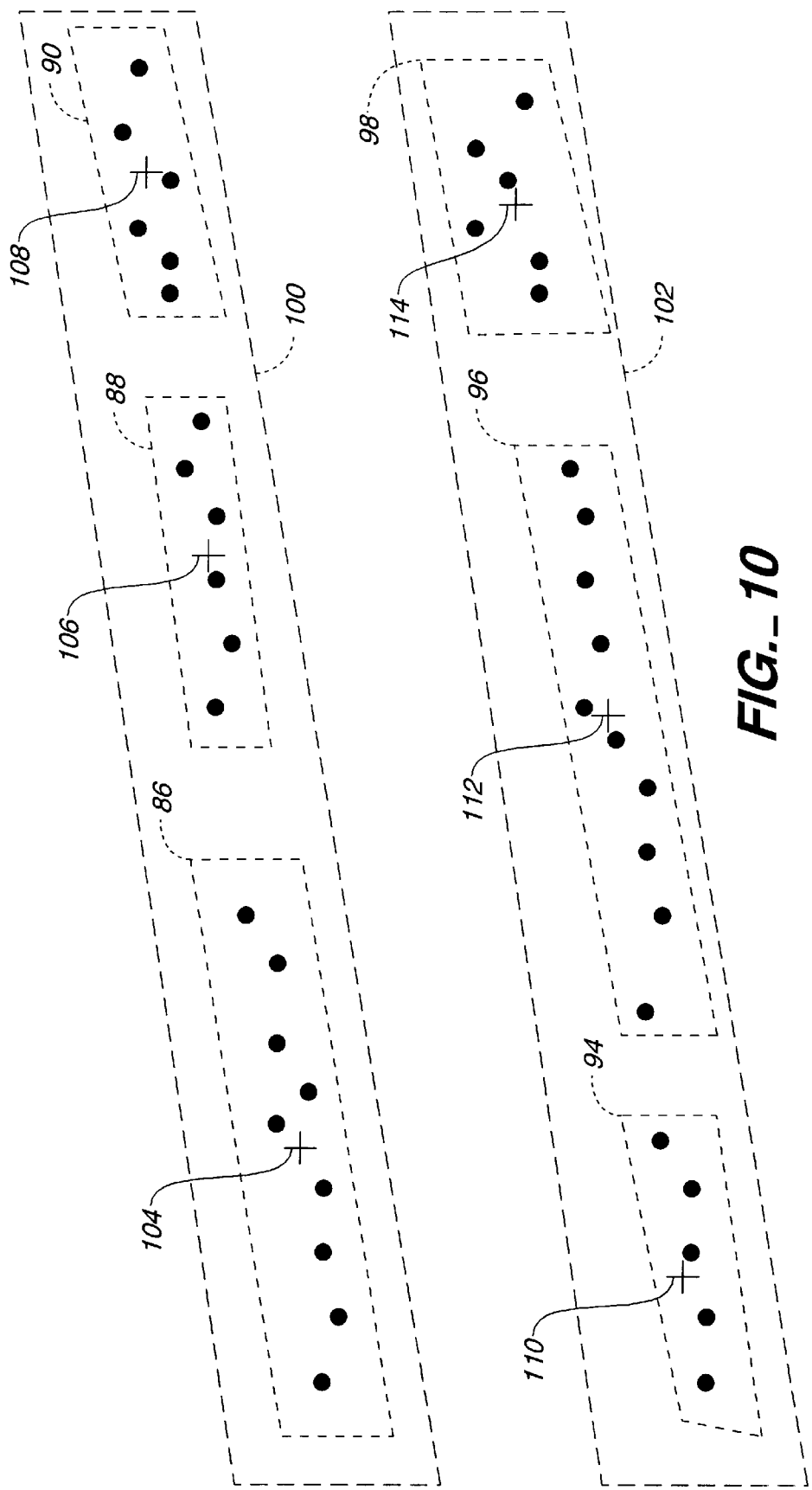
FIG._10

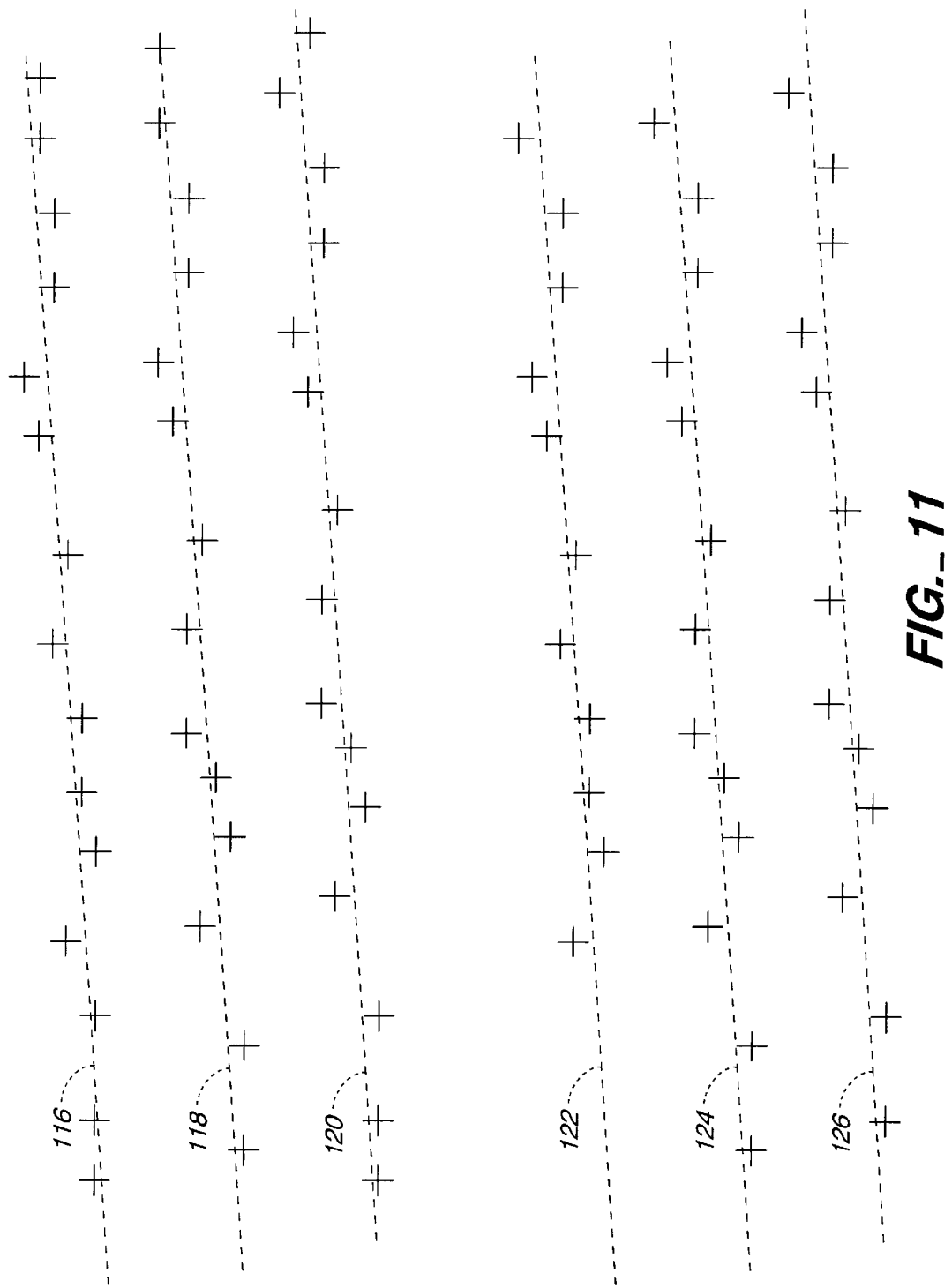

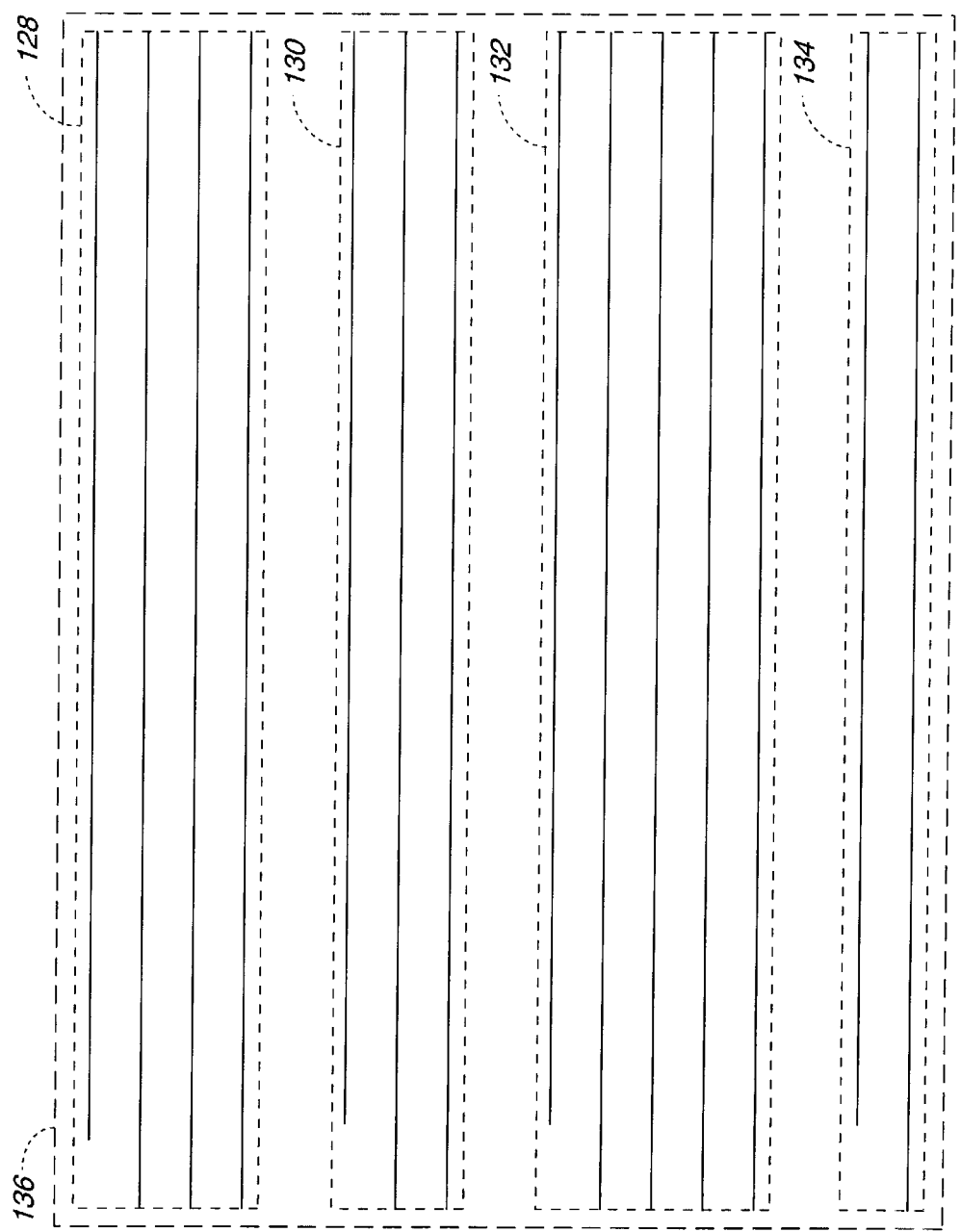
FIG._12

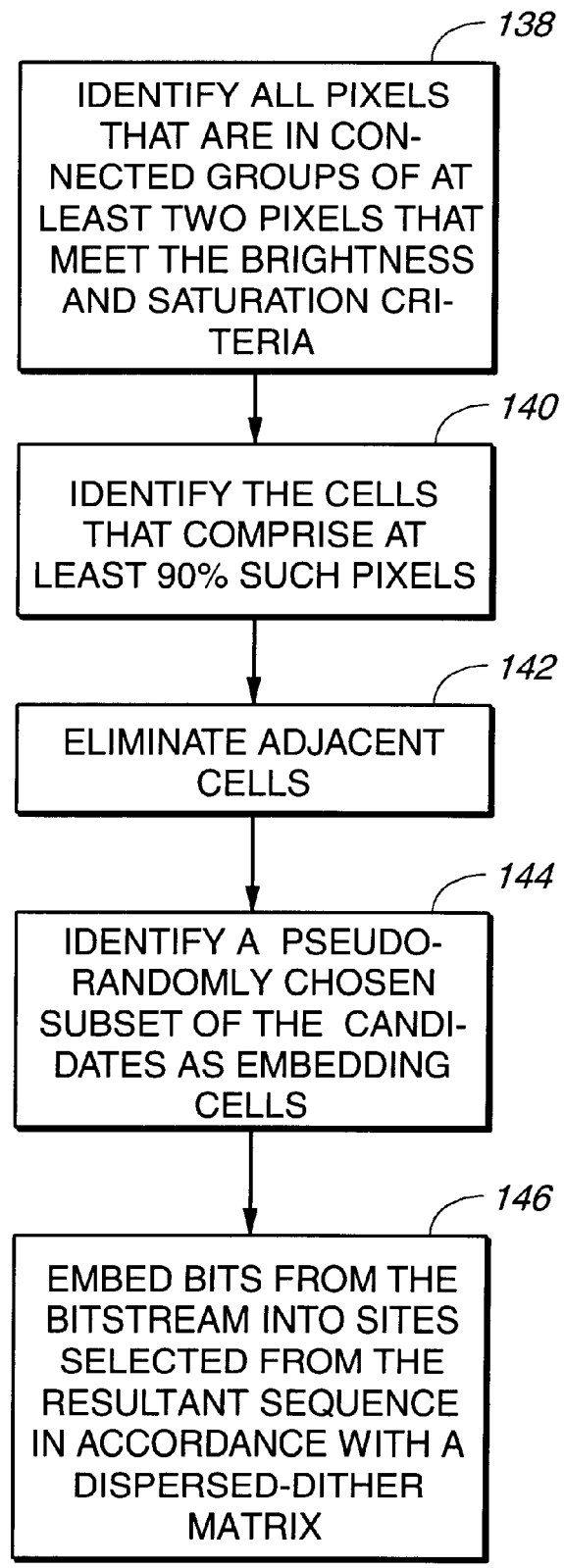
FIG._13

USER VERIFICATION BY ZERO-KNOWLEDGE INTERACTIVE PROOF

This application is a continuation-in-part of U.S. patent application Ser. No. 09/136,161, which was filed on Aug. 18, 1998, by Bhattacharjya et al. for Information Embedding in Document Copies.

BACKGROUND OF THE INVENTION

The present invention is directed to producing document copies and in particular to verifying a copy's provenance.

The ubiquity of photocopies and telecopiers in businesses and other environments has afforded a great deal of information-transfer convenience. Unfortunately, there are a number of situations in which this convenience is not entirely beneficial. It can make it hard to restrict copying when a confidentiality agreement, for instance, requires such a restriction. Also, photocopying can mask the fact that a document has been altered. That is, an erasure or "white-out" clearly visible in an original document may not be apparent at all in a photocopy or telecopy.

In policing photocopier or telecopier use, it would be helpful to be able to verify that a given photocopy or telecopy was actually produced by its purported source. This would help in complying with agreements not to copy and may have forensic applicability in enforcing laws against fraud.

SUMMARY OF THE INVENTION

I have developed a way of verifying document-copy provenance that is secure and easy to apply. The inventive method is a type of zero-knowledge interactive proof. Proofs of this general type are described, for instance, in Goldwasser, "The Knowledge Complexity of Interactive Proof Systems," *Proc. STOC* 1985.

The type of proof involved here is based on the concept of non-planar isomorphic graphs related by a secret permutation matrix. In this context, the graph can be envisioned conceptually as a set of points in space that are interconnected by "edges." For the purposes of the inventive method, such a graph can be represented simply as pairs of numbers, each number being a label that uniquely identifies one of the graph's interconnected points, or "nodes." A second graph is isomorphic to the first if it would be the result of, say, simply renaming the various nodes.

Now, it is a simple matter to generate a second graph isomorphic to the first graph: one simply devices a set of unique substitutions for all of the node labels. But the reverse problem, namely, determining the "permutation matrix" that specifies the replacements by which one isomorphic graph is derived from another, rapidly becomes computationally intractable with increases in the number of nodes and edges, at least if is the graphs are nonplanar, i.e., if they cannot be represented as co-planar nodes without having intersecting edges.

According to the invention, the copy machine embeds graph-defining information in the copy, preferably in a manner that is not readily detectable by human vision. Possibly together with information already existing in the document, the information specifies at least two isomorphic graphs that are related by a private permutation matrix. The permutation matrix is preferably known only to the copy-machine operator or, more typically, a "smart card" that the operator owns. As another alternative, it may be stored in the copier by the copier vendor.

To verify the copy's provenance, the verifying entity employs a publicly known technique for extracting the graphs from an image of the document copy. Then a "prover," i.e., a purported source, provides a series of test graphs that should be isomorphic to the graphs extracted from the document. For each test graph, the verifier randomly chooses between the (typically two) extracted graphs and thereby challenges the prover to generate the permutation matrix that relates the test graph to the chosen graph. If the prover is able to produce such a permutation matrix consistently over a large number of challenges, then the verifier can have a high level of confidence that the prover is in possession of the secret permutation matrix and should therefore be the document copy's source.

This method is highly secure, since it requires no transmission of any secret key. And, with the exception of the need for a standard method by which to extract the graphs, it requires no complicated infrastructure, such as a private-key registry.

BRIEF DESCRIPTION OF THE DRAWINGS

The invention description below refers to the accompanying drawings, of which:

FIGS. 1A and 1B are conceptual graph diagrams employed to explain the verification technique that the invention employs;

FIG. 2 is a block diagram depicting a photocopier that can embed a verification message in accordance with the present invention's teachings;

FIG. 3 is a block diagram of a system for verifying a document copy's source in accordance with the present invention;

FIG. 4 is a block diagram of an exemplary set of operations that the photocopier's image processor may perform;

FIG. 5 is a block diagram that depicts in more detail FIG. 4's operation of making label changes in accordance with the message to be embedded;

FIG. 6 is a diagram that illustrates character outlining that photocopiers employing the present invention's teachings may perform;

FIG. 7 is a diagram similar to FIG. 6 but illustrating the results of modulating label assignment in accordance with the message to be embedded;

FIG. 8 is a diagram that illustrates low-resolution text-pixel identification;

FIG. 9 is a similar diagram depicting centroids of connected sets of such pixels;

FIG. 10 is a diagram of those centroids' grouping into word- and line-sized sets;

FIG. 11 is a diagram depicting lines having the best least-squares fits to line-sized centroid sets;

FIG. 12 is a diagram illustrating a bounding box by which the photocopiers' image processor establishes a grid of cells; and FIG. 13 is a block diagram of the process for selecting from among those cells and embedding information in the cells thus selected.

DETAILED DESCRIPTION OF AN ILLUSTRATIVE EMBODIMENT

Before discussing the present invention in detail, it helps to review the principles on which the present invention's type of zero-knowledge interaction proof that it uses is based. As was stated above, the present invention is a mechanism for verifying the provenance of a document copy: a "prover" entity proves that it is the source of a document copy—and in particular of information embedded in the copy—by correctly answering questions whose correctness a "verifier" entity can assess by information that it extracts from the document. The present invention's approach involves the use of "permutation matrices" to generate "isomorphic graphs."

A graph in this context is a group of nodes and connecting edges, as FIG. 1A illustrates. For present purposes, the various nodes' spatial positions are not particularly of interest; for present purposes the graph is simply a list of edge-connected node pairs. (We impose the requirement that it has no isolated nodes: each node is connected to at least one other node.) So we can represent FIG. 1A's graph simply as the following matrix $G_1$, in which each row is an (unordered) pair of connected nodes:

$$G_1 = \begin{bmatrix} 1 & 2 \\ 1 & 3 \\ 1 & 5 \\ 2 & 4 \\ 2 & 6 \\ 3 & 4 \\ 3 & 7 \\ 4 & 8 \\ 5 & 6 \\ 5 & 7 \\ 6 & 8 \\ 7 & 8 \end{bmatrix} \quad (1)$$

One can readily include such a representation in a message that is embedded in a document copy in a manner that will be discussed below.

Of course, FIG. 1A's node numbering is purely arbitrary; one could re-number the nodes as FIG. 1B illustrates and represent the same topology with:

$$G_2 = \begin{bmatrix} 1 & 3 \\ 1 & 5 \\ 1 & 6 \\ 2 & 4 \\ 2 & 7 \\ 2 & 8 \\ 3 & 7 \\ 3 & 8 \\ 4 & 5 \\ 4 & 6 \\ 5 & 8 \\ 6 & 7 \end{bmatrix}.$$

$G_1$ and $G_2$ are isomorphic: although they use different labels, they represent the same topology.

To express the relationship between two isomorphic graphs, we introduce the notation $G_2 = P \cdot G_1$, where $P \equiv [a \ b]$, a and b are equal-sized column vectors, no column-vector element is repeated in the same vector, a includes every node of $G_1$, and the operator "·" in the foregoing notation means that $G_2$ is the result of replacing each element of a in $G_1$ with the corresponding element of b. We refer to matrix P as the permutation matrix that relates the two isomorphic graphs. The permutation matrix that defines the relationship between the graphs $G_1$ and $G_2$ of FIGS. 1A and 1B is:

$$P = \begin{bmatrix} 1 & 5 \\ 2 & 8 \\ 3 & 4 \\ 4 & 2 \\ 5 & 1 \\ 6 & 3 \\ 7 & 6 \\ 8 & 7 \end{bmatrix}. \quad (3)$$

Now, it is a simple matter to produce an arbitrary permutation matrix and employ it to generate a second graph isomorphic to a first graph: the computational complexity of doing so increases only linearly with the number of nodes. But the reverse problem, i.e., that of determining the permutation matrix that relates two given isomorphic graphs, can be more difficult, at least if each graph is non-planar, i.e., if it cannot be drawn in a plane without having its edges intersect. (Although the graphs of FIGS. 1A and 1B are so drawn as to suggest a three-dimensional relationship, they actually are planar, since the same number of coplanar nodes can be so laid out that none of the specified edges intersect. But it is a simple matter to guarantee that a graph is non-planar: a graph in which at least six nodes form a completely connected subset is necessarily non-planar.) If graphs are non-planar, the task of determining the permutation matrix soon becomes computationally intractable as the numbers of nodes and connections increase.

The illustrated embodiment's verification technique is based on this complexity. It assumes a secret permutation matrix $P_p$ known only to the prover. If the document contains representations of two isomorphic graphs related by $P_p$, the prover can show itself to be their source—as well as the source of any accompanying embedded information—by proving possession of $P_p$.

But proving possession of $P_p$ by disclosing it would make $P_p$ thereafter useless for verification purposes; it then would no longer be secret. So the prover instead employs an indirect method, one that involves preparing a new, test permutation matrix $P_t$ and generating a test graph $G_t = P_t \cdot G_2$ (or, equivalently, preparing a test permutation matrix $P_t'$ and generating $G_t = P_t' \cdot G_1$). Specifically, the prover discloses $G_t$ to the verifier and then demonstrates that it can produce not only $P_t$ such that $G_t = P_t \cdot G_2$ but also another permutation matrix $P_t'$ such that $G_t = P_t' \cdot G_1$. This would be computationally intractable for someone not in possession of $P_p$. But it is easy for someone who knows $P_p$, because $P_t' = [a_p P_t \cdot b_p]$.

On the other hand, showing the verifier both $P_t$ and $P_t'$ is undesirable because one can readily derive the secret permutation matrix $P_p$ from the test permutation matrices $P_t$ and $P_t'$. Instead, the process is repeated—i.e., the prover produces N test graphs and answers the corresponding challenge N times—but the verifier is permitted to ask only for $P_t$ or $P_t'$ in any iteration; it cannot ask for both in the same iteration.

Now, correctly producing the requested permutation matrix once is not by itself a reliable indication of the prover's authenticity, since a prover not in possession of the secret permutation matrix can generate the test graph from either $G_1$ or $G_2$ and have a fifty-fifty chance that the chosen graph will be the one to which the verifier will ask the test graph's relationship. But a false prover's chance of passing all challenges is only $2^{-N}$ if the process is repeated N times.

FIG. 2 depicts a photocopier that employs this concept. An optical scanner 12 generates as its output electrical signals that digitally represent an image of a document that it has optically scanned. An image processor 14 performs a number of operations to produce a processed image, and it applies electrical signals representing this processed image to an output device such as a laser printer 16. The image-processing circuitry 14 may be embodied in a programmable digital signal processor or general-purpose microprocessor, and the instructions that direct it to perform operations of the type that will be described below may be stored on a disc 18 or other device for storing machine-readable instructions.

In the course of this image processing, the image processor 14 develops a graph $G_1$, which is one of two isomorphic graphs related by the private permutation matrix. The illustrated embodiment derives $G_1$ by performing a predetermined extraction operation 20 on the input image. The system then derives from $G_1$ an isomorphic graph $G_2$ related to $G_1$ by the private permutation matrix $P_p$. In cases in which the intention is simply to enable a verifier to confirm that a given photocopier is the one that produced the copy, the image-processing circuitry 14 itself will perform the task of generating the second graph $G_2$ from the first one. In other cases, the copier will not itself be in possession of $P_p$ but will instead include an interface device into which a user can place a small, $P_p$-containing "smart card" 22. The smart card receives signals representing $G_1$ and uses $P_p$ to generate the isomorphic graph $G_2$. It then employs the interface to send the photo-copier 10 electrical signals that represent $G_2$.

As will be explained in detail below, the image-processing circuitry 14 so processes the image as to embed in it codes representing $G_2$, possibly together with other information, while retaining the image features from which $G_1$ can be extracted. Typically after further processing, the image-processing circuitry 14 sends the printer mechanism 16 signals that represent the resultant image.

The printer that generates the document copy does not need to reside at the same location as the scanner 12. For example, a local-network or inter-network connection 26 may conduct signals representing the image to a remote printing device 28, which may itself perform further image processing, typically of the type employed to ensure proper color fidelity, before it prints the copy.

The issue of the document copy's provenance may arise at some later time. To determine whether the document was indeed made by, say, a user in possession of that smart card, the copy is scanned, possibly but not necessarily by a scanner 30 (FIG. 3) separate from the scanner 12 used in originally generating the document. An image processor 31 then performs operations 32 and 34 on the image to extract the two graphs $G_1$ and $G_2$, and signals representing these two "base" graphs are sent to a verifier circuit 36. Preferably, operations 32 and 34 will be established as a publicly known standard. FIG. 3's dashed line 38 indicates that the elements below it can be located remotely from those above it, although this is not required.

A user who then wants to determine whether (or prove that) the copy is the one that he has made inserts his smart card 22 into an appropriate interface to the verifier circuit 36, and the smart card then assumes the role of the prover entity mentioned above. That is, it repeatedly generates test graphs $G_t(n)$, the verifier counters with a corresponding challenge $C(n)$, and the smart card 22 responds with the permutation matrix $P_t(n)$ that relates the chosen base graph to the corresponding test graph. The verifier 36 determines whether each test permutation matrix relates the corresponding test graph to the chosen base graph and, after a number of challenges, generates a verification signal to indicate whether the smart card 22 has answered all challenges correctly. If so, the smart card is confirmed to have been used to generate the copy.

The image processors in photocopiers that employ the present invention's teachings can vary widely, but FIG. 4 depicts an exemplary set of functions that such an image processor may perform. Block 44 represents an operation in which the image processor re-orients text that is canted because, e.g., the original document was oriented improperly on the scanner. Specifically, the image processor generates an image whose pixel values it calculates by so interpolating among the input image's pixel values that the resultant, de-skewed image's pixel rows are parallel to the image text rows. Now, the image's digital representation may be gray-scale or color, but each pixel value should consist of one (in the case of gray-scale) or more (typically three or four in the case of color) multiple-bit values. A typical value resolution is 8 bits per color component per pixel. Blocks 46 and 48 represent operations by which the image processor identifies text regions and embeds information in them by modulating their darknesses.

FIG. 5 is an overview of the block 46 operation. That drawing's block 50 represents dividing the image into multiple-pixel grid cells, and its block 52 represents identifying cells whose contents are predominantly parts of text characters, as will be described in more detail presently. From among the text cells thus identified, the image processor selects cells to be used for embedding information.

As block 54 indicates, the image processor associates the cells thus selected with respective binary values of the bit stream that represents the message to be embedded. The intensities of the input image's text-region pixels are low but not ordinarily maximum black. Block 56 represents embedding the message by selectively replacing those text pixels' values with, say, maximum black in accordance with a message bit stream.

This operation may cooperate with other image-processor operations. For instance, there may be a text-enhancement operation that includes a step, represented by FIG. 4's block 57, of assigning edge labels in preparation for enhancing text characters' legibility by blackening their outlines. In FIG. 6 the cross-hatched pixels are those that are dark enough to be considered text regions, and the pixels with the black fill represent those that FIG. 4's step 57 has identified as meeting certain criteria that it associates with text edges. Commonly assigned U.S. patent application Ser. No. 09/135,871, filed on Aug. 18, 1998, by Ancin et al. for Text Enhancement for Color and Gray-Scale Documents, now U.S. Pat. No. 6,227,725, issued on May 8, 2001, and hereby incorporated by reference, describes a technique for assigning such labels. The value of any pixel to which such labels remain assigned after label-changing operations described below will be replaced with a predetermined value, typically maximum black.

FIG. 4's step 46 supplements and modulates this operation's output. Specifically, that step embeds its information, as was just explained, by additionally labeling some of the text character's interior pixels for similar darkening. Conversely, if one of the pixels labeled an edge in step 57 is located within one of the embedding sites but the embedded message's value for that site dictates that the site not be darkened, step 46 removes the label that step 57 assigned.

For example, suppose that FIG. 7's (5×5) cells 58 and 59 are selected as embedding sites. Suppose further that the encoding scheme requires two such sites to embed a single bit: a darkened site followed by one that is not darkened will represent a binary 1, while a non-darkened site followed by a darkened site represents a binary 0. To embed a binary 1, all pixels in cell 58 that had been identified as text-region pixels are set to maximum black in FIG. 4's operation 48.

Conversely, none of the pixels in cell 59 that had been identified as text-region pixels is set to maximum black, not even those that, as FIG. 6 illustrated, had initially been designated by FIG. 4's operation 57 as text-edge pixels. In some embodiments, cell 59's text pixels would instead remain unchanged except possibly by unrelated further processing, such as color correction. In others, they would is be distinguished in some other way, such as by being set to a predetermined lighter value or by being lightened by a predetermined amount.

The image as thus revised is typically subjected to further processing, as FIG. 4's block 60 indicates, but the processing is so performed as to preserve the embedding sites' darkness modulation. The printer then renders the image with a value resolution of several bits per pixel or pixel color component. This can be achieved by affording multiple-bit-per-printer-pixel value resolution and/or by employing a printer spatial resolution that exceeds the scanner's spatial resolution.

We now turn to the way in which the cell grid is defined. This operation begins by considering the image as a whole. For this purpose, it is beneficial to employ a low-resolution rendition of the image. In some embodiments the low-resolution scan can be performed optically. For instance, FIG. 2's scanner 12 may be, say, a 300-dot-per-inch ("dpi") scanner whose optics can be adjusted momentarily to take an initial, 100-dpi scan. In other cases, the high-resolution output of a fixed-resolution scanner can be low-pass filtered digitally and the result re-sampled at the lower resolution.

From this image, the image processor identifies (low-resolution) pixels considered to be located in text regions. The criterion for identifying such pixels in gray-scale-only images may be that their brightnesses must be less than a certain threshold. That threshold may be fixed, or it may be arrived at by taking a histogram of the image's pixel values and selecting all those whose brightnesses are below, say, the 25th percentile. If the image is a color image, the system would typically impose the further requirement that the color saturation be below a certain threshold. Again, the threshold may be fixed, or it can be derived from, say, histogram values. Also, the saturation threshold applied to a given pixel may depend on that pixel's intensity. Other criteria, too, can be used to select text regions.

The result will be a pattern of pixels that meet the criteria. For instance, FIG. 8 illustrates a pattern that can result from the three-letter sequence "Sim." The pixels thus is identified are divided into sets of contiguous pixels. FIG. 8 depicts five such sets 62, 64, 66, 68, and 70. These sets, or "components," as we refer to them, correspond roughly to individual characters. But a pair of characters can be close enough to result in a single component. And FIG. 8 illustrates that an individual character can result in more than one component: The "i" results in two components 64 and 66, while the "m" results in two components 68 and 70. This is acceptable because the purpose for grouping text-region pixels into components is not to identify characters but rather to provide input into a repeatable way of establishing a reference position. Still, components consisting of fewer than eight pixels are not used in further processing, nor are components that are more than two-hundred pixels wide or fifty pixels high.

As FIG. 9 illustrates, the image processor then determines the (sub-pixel-resolution) centroids 72, 74, 76, and 78 of the remaining components' respective smallest enclosing rectangles 80, 82, 84, and 86. As FIG. 10 illustrates, those centroids are then grouped into sets 86, 88, 90, 94, 96, and 98 of centroids spaced from adjacent centroids in the set by less than a minimum inter-word spacing. That minimum spacing usually bears a predetermined ratio to the average size of the component bounding boxes. We refer to these sets as "words" because they usually do correspond to actual text words, although the method does not depend on this.

These word sets are then divided into groups 100 and 102 of word sets separated from their neighbors by less than a minimum inter-line spacing. Although the correspondence of components to text characters is somewhat rough, the correspondence of the thus-derived word sets to actual words is less so, and the correspondence of line sets of those centroids to text lines is ordinarily quite good in the following sense: although the spacings between words in a line of actual text will occasionally be so great as to result in two lines sets of centroids, separate text lines will nearly always result in separate line sets.

With the line sets thus determined, word centroids 104, 106, 108, 110, 112, and 114 are computed from respective word sets' constituent component centroids. As FIG. 11 illustrates, the image processor then computes the lines 116, 118, 120, 122, 124, and 126 that have the best least-squares fits to respective line sets' word centroids. If there is a non-zero skew angle between the lines thus determined and the input scan lines, conventional multirate digital-processing techniques are employed to generate the values of pixels arrayed in rows parallel to the least-squares-fit lines.

Actually, this de-skewing may be performed in a two-step process. In the first step, the re-sampling may occur as just described. In the second step, new lines are computed that represent the best least-squares fit through the bottoms of the resultant component positions. Then the data are again re-sampled to generate the values of pixels disposed in rows parallel to the newly computed lines.

With the image now de-skewed, the image processor computes line segments delimited by the end component centroids in respective line sets. Each line segment that is spaced by more than a predetermined inter-paragraph minimum from the preceding line, or that is indented by more than a predetermined minimum indentation from its fellows, is considered to begin a new paragraph, and the line segments are divided into paragraph sets exemplified by FIG. 12's sets 128, 130, 132, and 134.

It turns out that the process just described of locating paragraphs in this manner is quite repeatable, so the grid system's origin is established at the upper left corner of the smallest rectangle 136 that includes all of the paragraph line-segment sets thus determined.

Actually, the process of identifying the paragraphs is superfluous as far as the grid-origin determination is concerned: it can equivalently be determined from the smallest box that bounds the line segments. But the paragraph identification can be used for other purposes. In particular, it can be used to derive one of the base isomorphic graphs. For example, text components identified as described above in connection with FIG. 8 can be numbered in accordance with a publicly known scheme—e.g., they could be numbered in the order in which they are identified—and there could be some publicly known scheme for determining the connections. One approach may be that, say, the numbers associated with all components in the same paragraph would be considered connected to each other, while, say, all of the even-numbered nodes from even-numbered paragraphs would be considered connected to the odd-numbered nodes in odd-numbered paragraphs. Another approach would be that all nodes corresponding to components from "words" consisting of certain numbers of components would be considered connected to each other and to selected nodes corresponding to components of other-sized words. Other ways to classify nodes for connection could also be used.

Whereas the de-skewing and origin-establishing operations described so far were performed with a low (e.g., 100 dpi) pixel resolution to reduce computational overhead, the image's original, high-resolution image data are now re-sampled with line scans oriented in accordance with the de-skewing operation described above, and the resultant pixel values are divided into 5×5 cells beginning at the just-determined origin. With a grid thus determined, the image processor embarks upon a message-embedding operation depicted in FIG. 13.

Graph $G_2$ can readily be specified by some bit stream of any convenient format, this graph specification may be concatenated with a further bit stream containing other information, and the resultant binary message will ordinarily be provided with an error-correction code. It is the resultant bit stream that the image processor embeds in accordance with FIG. 13's procedure.

To select sites at which respective bits are to be embedded the image processor first identifies all pixels that meet certain criteria characteristic of a pixel's being part of a text region, as block 138 indicates. Typically, one criterion is that the pixel's brightness and, if it is in a color image, saturation are below respective predetermined thresholds. The illustrated embodiment also imposes the criterion that the pixel must adjoin at least one other pixel that meets the threshold criterion.

The thresholds used in block 138's operation can be fixed, or they can be determined from the image contents in various ways. One way is to employ the text-edge labeling that results from FIG. 4's operation 57. In accordance with that approach, the image processor computes histograms of all edge-labeled pixels' brightnesses and saturations, and it determines the thresholds accordingly. For instance, the brightness and saturation thresholds may be placed at, say, the respective histograms' 95th percentiles. Alternatively, the threshold employed may be a weighted average of the saturation and brightness so chosen that the criterion is met by, say, 95% of the edge-labeled pixels. Clearly, other approaches can be used as well.

The image processor then proceeds to an operation, represented by FIG. 13's block 140, in which the processor identifies all of the 5×5 cells in which at least, say, 90% of the pixels meet the text-indicating criteria. From the set of cells thus identified, the processor eliminates enough cells to prevent any cells in the set from being adjacent to each other. This is advantageous when the embedded message is to be recovered, because it reduces the likelihood of cell-to-cell cross-talk, which may otherwise result from slight misregistrations between embedding and recovery sites. Block 142 represents eliminating those cells.

The remaining cells are the candidate cells referred to in FIG. 5's block 52, and the next task is to select from among these candidate cells the ones that will be employed for embedding. The candidate cells can be numbered in the order of their occurrence from left to right and top to bottom. To suppress visual effects that can result from any periodicity in the candidate cells, the processor employs this numbering and a pseudo-random sequence to select the cells that will qualify as embedding sites. The same pseudo-random sequence can be employed every time. Alternatively, a seed placed in or derived from the document in some manner can be used to initialize a pseudo-random-sequence generator available to both the embedding party and the recovering party. For example, the seed may be the number of paragraph sets determined in the grid-establishing operation. A hybrid approach would be to use a fixed initial part of the sequence, embed a variable seed in the sites determined in accordance with the initial sequence part, and determine the remaining sites in accordance with a sequence determined from that seed.

As FIG. 13's block 146 indicates, the image processor uses a so-called dispersed-dither matrix to determine the order in which it uses the selected cells to embed the message's successive bits. Dither-matrix elements are numerical values that, being matrix elements, occupy respective rows and columns. So each element can be thought of as having a spatial distance from each other element. What distinguishes a dispersed-dither matrix is that elements tend to be relatively distant from each other in matrix position if they are close to each other in value. Such matrices are widely used for electronic half-toning, but we use them here for a different purpose.

Let us assume that the matrix-element values are all the integers from zero to some positive value M. To embed the bit stream's first bit, the processor finds the dither-matrix location that contains a zero, since that is the lowest matrix-element value. Suppose that the zero is in the fifth location in the dither matrix's tenth row and the system employs two sites to embed each bit. Then the system will embed the bit in fifth selected-site pair in the tenth site row. If there is no fifth site pair in that row, then the processor proceeds to the dither-matrix location containing a one. Otherwise, it attempts to embed the second bit in the site pair whose position corresponds to the dither-matrix location that contains the value one. This continues until all of the bits have been embedded. By so dispersing the encoding, the recovery process is made relatively robust to "burst" errors, which coffee spills and similar mishaps sometimes cause.

To recover the information, the copy is scanned and embedding sites identified just as they are in the embedding operation, and the embedded information is then recovered by observing the darkness variations at the sites thus identified. Some embodiments may employ enhancements to increase repeatability and robustness of this process. For example, although the cells must have the same (e.g., five-pixel) pitch as in the embedding operation, cell darknesses may be based on overlapping cells that are, say, 7×7 to make the procedure more tolerant of misregistrations between embedding and recovery. Alternatively, or in addition, the embedding-site identification may be repeated several times, one time based on the grid layout determined as described above and other times based on grids spaced from the original by one or two pixels in each direction. Since the message will contain error-correction coding or other redundancy, the correct message can be identified if the results differ.

As mentioned above, the embedded message can include other information in addition to the graph specifications. For example, the further information may include the photocopier's make and serial number and the date on which the copy was made. Typically, the method for recovering the raw message will be publicly available, but the raw message may be the result of encrypting a clear-text message that can be recovered by only the manufacturer or only the owner.

From the foregoing description, it is apparent that the present invention provides a convenient, secure, and reliable way to verify the source of a document copy. The verifier is able to authenticate the prover's claim without needing any secret information and without requiring the cooperation of any trusted third party, such as a key registry. The invention thus constitutes a significance advance in the art.

What is claimed is:

1. For proving the provenance of a document copy, a method that includes the steps of:
   A) taking an image of a source document;
   B) embedding in the image an encoding of at least a first base graph that is related by a private permutation matrix to a second base graph whose encoding is embedded in the image;
   C) generating output image signals that represent the image with the base graphs embedded in it;
   D) repeatedly transmitting, to a verifier, test-graph signals representing successive test graphs, each test graph being related to the base graphs by respective test matrices associated with that test graph; and
   E) for each test graph:
      i) receiving from the verifier a challenge signal designating a respective chosen one of the base graphs; and
      ii) sending the verifier a response signal representing the permutation matrix that relates the test graph to the base graph designated by the challenge signal.

2. A method as defined in claim 1 wherein the base graphs are nonplanar graphs.

3. A method as defined in claim 2 further comprising the steps of:
   A) deriving the second base graph from the image taken of the source document, and
   B) generating the first base graph from the second base graph in accordance with the private permutation matrix.

4. A method as defined in claim 3 wherein the base graphs are nonplanar graphs.

5. A method as defined in claim 3 wherein the embedding step includes:
   A) identifying sites in the image that meet predetermined site criteria; and
   B) setting to predetermined values constituent pixels included in sites selected in accordance with the encoding of the first base graph.

6. A method as defined in claim 1 wherein the embedding step includes:
   A) identifying sites in the image that meet predetermined site criteria; and
   B) setting to predetermined values constituent pixels included in sites selected in accordance with the encoding of the first base graph.

7. A method as defined in claim 6 wherein the base graphs are nonplanar graphs.

8. A method as defined in claim 6 wherein the step of identifying sites in the image comprises dividing the image into a grid of pixel-including cells and identifying as sites those cells in which at least a predetermined percentage of the included pixels meet predetermined text-region-indicating criteria.

9. A method as defined in claim 8 wherein:
   A) the encoding of the first base graph consists of a sequence of code bits; and
   B) the step of setting constituent pixels of selected sites to predetermined values includes:
      i) associating each code bit with respective two-site sequences consisting of respective first and second sites;
      ii) setting pixels of the first site but not of the second site when the associated code bit has one value; and
      iii) setting pixels of the second site but not of the first site when the associated code bit has the other value.

10. A method as defined in claim 8 wherein:
    A) the encoding of the first base graph consists of a sequence of code bits; and
    B) the step of setting constituent pixels of selected sites to predetermined values includes:
       i) associating each code bit with respective three-site sequences consisting of respective first, second, and third sites;
       ii) setting pixels of the first and third sites but not of the second site when the associated code bit has one value; and
       iii) setting pixels of the second site but not of the first and third sites when the associated code bit has the other value.

11. For verifying a document copy's provenance, a method of that includes that steps of:
    A) taking an image of the document copy and interpreting the image as including embedded encodings of a plurality of isomorphic base graphs;
    B) repeatedly receiving, from a putative source, test-graph signals representing successive test graphs;
    C) for each test graph:
       i) sending the putative source a challenge signal designating a respective chosen one of the base graphs;
       ii) receiving from the putative source a response signal representing a permutation matrix associated with that test graph; and
       iii) deciding whether the permutation matrix is correct by determining whether it relates the chosen base graph to the test graph with which the permutation matrix is associated; and
    D) generating a verification signal that indicates whether all of permutation matrices are correct.

12. A photocopier comprising:
    A) an optical scanner for scanning a source document and generating electrical source-image signals representing a source image of the document;
    B) image-processing circuitry responsive to the source-image signals for performing a sequence of at least one image-revision step, in which sequence each image-revision step receives an input image consisting of input pixels and produces therefrom an output image consisting of output pixels, the input image of a first image-revision step is the source image, the input image of any subsequent image-revision step is the output image of a preceding image-revision step, the image-processing circuitry generates electrical copy-image signals representing the output image of a last image-revision step, and one said image-revision step is an embedding operation that includes generating its output image by so modifying its input image as to embed therein an encoding of at least a first base graph that is related by a private permutation matrix to a second base graph whose encoding is embedded in its output image; and
    C) a printer mechanism responsive to the copy-image signals for printing the output image of the last image-revision step represented thereby.

13. A photocopier as defined in claim 12 wherein the base graphs are nonplanar graphs.

14. A photocopier as defined in claim 13 wherein the embedding operation further comprises the steps of:
    A) deriving the second base graph from the image taken of the source document; and
    B) generating the first base graph from the second base graph in accordance with the private permutation matrix.

15. A photocopier as defined in claim 14 wherein the base graphs are nonplanar graphs.

16. A photocopier as defined in claim 14 wherein the embedding operation includes:
   A) identifying sites in the embedding operation's input image that meet predetermined site criteria; and
   B) setting to predetermined values constituent pixels included in sites selected in accordance with the encoding of the first base graph.

17. A photocopier as defined in claim 12 wherein the embedding operation includes:
   A) identifying sites in the embedding operation's input image that meet predetermined site criteria; and
   B) setting to predetermined values constituent pixels included in sites selected in accordance with the encoding of the first base graph.

18. A photocopier as defined in claim 17 wherein the base graphs are nonplanar graphs.

19. A photocopier as defined in claim 17 wherein the step of identifying sites in the image comprises dividing the embedding operation's input image into a grid of pixel-including cells and identifying as sites those cells in which at least a predetermined percentage of the included pixels meet predetermined text-region-indicating criteria.

20. A photocopier as defined in claim 19 wherein:
   A) the encoding of the first base graph consists of a sequence of code bits; and
   B) the step of setting constituent pixels of selected sites to predetermined values includes:
      i) associating each code bit with respective two-site sequences consisting of respective first and second sites;
      ii) setting pixels of the first site but not of the second site when the associated code bit has one value; and
      iii) setting pixels of the second site but not of the first site when the associated code bit has the other value.

21. A photocopier as defined in claim 19 wherein:
   A) the encoding of the first base graph consists of a sequence of code bits; and
   B) the step of setting constituent pixels of selected sites to predetermined values includes:
      i) associating each code bit with respective three-site sequences consisting of respective first, second, and third sites; and
      ii) setting pixels of the first and third sites but not of the second site when the associated code bit has one value; and
      iii) setting pixels of the second site but not of the first and third sites when the associated code bit has the other value.

22. For verifying a document copy's provenance, an apparatus that includes:
   A) an optical scanner for scanning the document copy and generating electrical source-image signals representing a source image of the document copy; and
   B) circuitry for:
      i) interpreting the source image as including embedded encodings of a plurality of isomorphic base graphs;
      ii) repeatedly receiving, from a putative source, test-graph signals representing successive test graphs;
      iii) for each test graph:
         a) sending the putative source a challenge signal designating a respective chosen one of the base graphs;
         b) receiving from the putative source a response signal representing a permutation matrix associated with that test graph; and
         c) deciding whether the permutation matrix is correct by determining whether it relates the chosen base graph to the test graph with which the permutation matrix is associated; and
      iv) generating a verification signal that indicates whether all of permutation matrices are correct.

23. A storage medium containing instructions readable by a computer to configure the computer to function as an apparatus for:
   A) receiving electrical signals representing an image of a source document;
   B) embedding in the image an encoding of at least a first base graph that is related by a private permutation matrix to a second base graph whose encoding is embedded in the image;
   C) generating output image signals that represent the image with the base graphs embedded in it;
   D) repeatedly transmitting, to a verifier, test-graph signals representing successive test graphs, each test graph being related to the base graphs by respective test matrices associated with that test graph; and
   E) for each test graph:
      i) receiving from the verifier a challenge signal designating a respective chosen one of the base graphs; and
      ii) sending to the verifier a response signal representing the permutation matrix that relates the test graph to the base graph designated by the challenge signal.

24. A storage medium as defined in claim 23 wherein the base graphs are nonplanar graphs.

25. A storage medium as defined in claim 24 further comprising the steps of:
   A) deriving the second base graph from the image taken of the source document; and
   B) generating the first base graph from the second base graph in accordance with the private permutation matrix.

26. A storage medium as defined in claim 25 wherein the base graphs are nonplanar graphs.

27. A storage medium as defined in claim 25 wherein the embedding step includes:
   A) identifying sites in the image that meet predetermined site criteria; and
   B) setting to predetermined values constituent pixels included in sites selected in accordance with the encoding of the first base graph.

28. A storage medium as defined in claim 23 wherein the embedding step includes:
   A) identifying sites in the image that meet predetermined site criteria; and
   B) setting to predetermined values constituent pixels included in sites selected in accordance with the encoding of the first base graph.

29. A storage medium as defined in claim 28 wherein the base graphs are nonplanar graphs.

30. A storage medium as defined in claim 28 wherein the step of identifying sites in the image comprises dividing the image into a grid of pixel-including cells and identifying as sites those cells in which at least a predetermined percentage of the included pixels meet predetermined text-region-indicating criteria.

31. A storage medium as defined in claim 30 wherein:
   A) the encoding of the first base graph consists of a sequence of code bits; and
   B) the step of setting constituent pixels of selected sites to predetermined values includes:

i) associating each code bit with respective two-site sequences consisting of respective first and second sites;

ii) setting pixels of the first site but not of the second site when the associated code bit has one value; and iii) setting pixels of the second site but not of the first site when the associated code bit has the other value.

32. A storage medium as defined in claim 30 wherein:

A) the encoding of the first base graph consists of a sequence of code bits; and B) the step of setting constituent pixels of selected sites to predetermined values includes:

i) associating each code bit with respective three-site sequences consisting of respective first, second, and third sites;

ii) setting pixels of the first and third sites but not of the second site when the associated code bit has one value; and iii) setting pixels of the second site but not of the first and third sites when the associated code bit has the other value.

\* \* \* \* \*